June 18, 1968  J. C. RAU  3,388,714
VENT ASSEMBLY
Filed Oct. 24, 1965
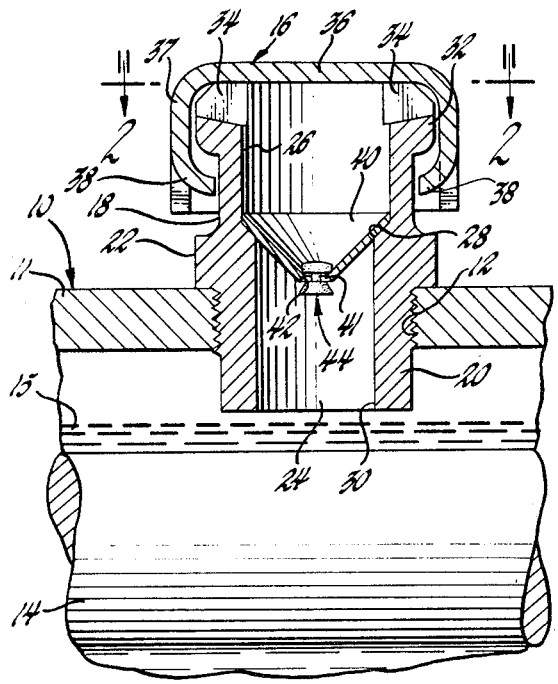
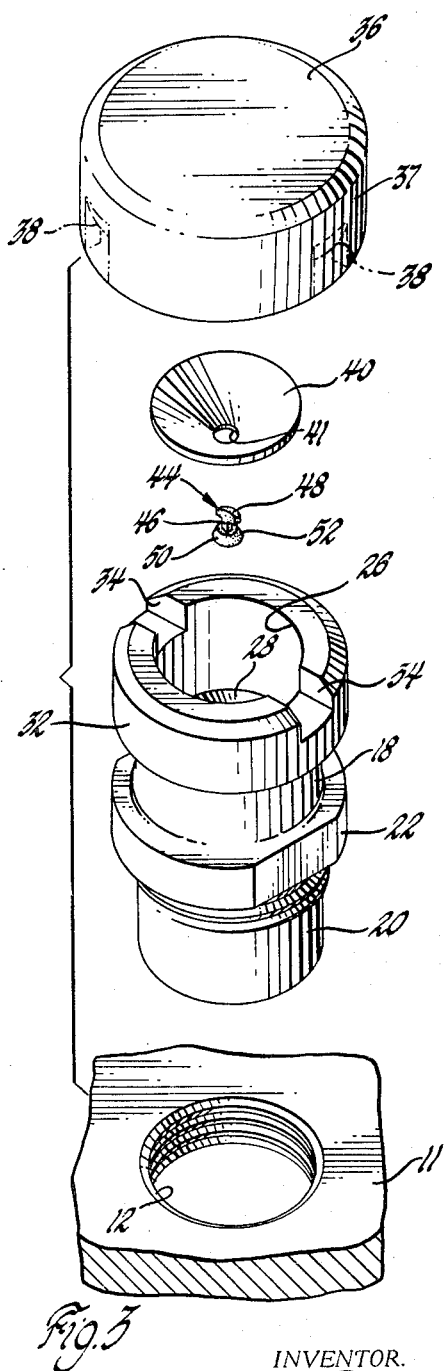
INVENTOR.
John C. Rau
BY
J. L. Carpenter
ATTORNEY 3,388,714
VENT ASSEMBLY
John C. Rau, Rochester, Mich., assignor to General Motors Corporation, Detroit, Mich., a corporation of Delaware
Filed Oct. 24, 1965, Ser. No. 504,302
1 Claim. (Cl. 137—202)

ABSTRACT OF THE DISCLOSURE

A vent assembly for a motor vehicle rear axle housing characterized by a frusto-conical float valve that shifts upwardly into surface-to-surface sealing engagement with a similarly tapered valve seat upon a surge of liquid within the valve body. The float valve remains seated until the liquid pressure is relieved at which time it falls under its own weight to a normally open position.

---

The vent assembly of this invention is especially adaptable for use with the rear axle housing of a motor vehicle. Air pressure build-up within the rear axle housing tends to occur during vehicle operation due to the increased temperature. An air vent is therefore required to equalize external and internal air pressure. Besides air, however, the housing contains lubricating liquids which are often accidentally lost through the air vent when the vehicle turns rapidly or is subjected to other movements causing liquid turbulence. Past attempts to prevent loss of these liquids through the air vent have not been successful.

The present invention solves this problem by providing a vent assembly having valve means therein. The valve means effectively permits air ventilation of the rear axle housing and prevents loss of lubricating liquid if it surges into the vent assembly.

One feature of this invention is that it provides an improved vent assembly.

Another feature is that it provides such a vent assembly incorporating valve means which effectively permit air ventilation of a liquid containing housing but prevent the escape of liquid therefrom.

Yet another feature is that it provides such a vent assembly for use with rear axle housings of motor vehicles.

The features of the invention will be made apparent to one skilled in the art by the following detailed description of a preferred embodiment of the invention.

In the drawings:

FIGURE 1 is a partially broken away view of a portion of a rear axle housing embodying a vent assembly according to the present invention;

FIGURE 2 is a view taken generally along the plane indicated by line 2—2 of FIGURE 1; and FIGURE 3 is an exploded view.

Referring to FIGURE 1, there is shown a portion of a conventional rear axle housing 10 of a motor vehicle having an upper wall 11 with a threaded opening 12. Within the housing is an axle assembly 14 and a lubricant 15, such as oil or grease, which partially fills the housing interior. A vent assembly 16 according to this invention is mounted in the opening 12 to ventilate the interior of the housing and prevent the escape of the lubricant.

The vent assembly 16 includes a generally cylindrical body 18 having an externally threaded portion 20 which is threaded into the opening 12. A central peripheral flange 22 of the body seats on the housing wall 11 and limits the inward movement of the vent assembly. An axial bore 24 through the body 18 provides an air ventilation passageway from the housing interior to atmosphere. The bore 24 consists of an area of maximum diameter 26, an inwardly tapered area 28, and an area of minimum diameter 30. An enlarged annular head portion 32 of the body 18 has a plurality of radially directed passageways 34 therein which communicate with the bore 24. A vent cap 36 rests atop the head portion 32 and has a downwardly projecting outer flange 37 which has an inner diameter greater than the head portion outer diameter. The flange is slit at several spaced points to form tab portions 38 which are bent inwardly to hold the cap about the head portion. The cap fits loosely so that it will not impede air flow through and about the head. The cap, however, does prevent outside materials, such as dirt and water, from entering the housing through the vent assembly.

Contained within the bore 24 and seating upon the tapered portion 28 is a conically shaped baffle plate 40 having a central aperture 41 therein. The plate edge about the aperture is machined to form a tapered valve seat 42. A float valve 44 is located in the aperture 41 and consists of a stem 46 which fits loosely within the aperture to allow air flow therethrough, a cross-bar or head 48 attached to one end of the stem which normally rests upon the conical baffle plate and limits travel of the valve in one direction but does not impede air flow, and a body or tapered plug 50 attached to the opposite end of the stem. The body has a face portion 52 which seats upon the valve seat 42 when brought into contact therewith to close the aperture.

The valve 44 is normally in the position shown in FIGURE 1. In this position, an air ventilation passageway from the interior of the housing to atmosphere exits through the bore 24 and passageways 34. This ventilation prevents dangerous build-up of pressure within the housing while the vehicle is in operation.

As the vehicle is operated, and especially when the vehicle is turning or progressing over rough terrain, movement of the lubricating liquid within the housing occurs. Should the level of the liquid rise within the housing and enter the bore 24, or should movement occur which causes the liquid to splash into the bore, it will strike the body 50 of the valve and float or lift the valve upward until it seats on the valve seat 42. This seals the aperture and prevents liquid loss since the aperture represents the only opening through which the liquid can escape through the vent assembly. The valve will remain seated until the liquid pressure is relieved. It will then fall under its own weight into the normally open position.

Thus this invention provides an improved vent assembly.

I claim:

1. A vent assembly for a rear axle housing having a chamber partially filled with a liquid comprising; a valve body connected to the housing above the liquid and having an air ventilation passageway formed therein including a first cylindrical bore portion nearest the liquid and a second cylindrical bore portion adjacent the first cylindrical bore portion, said second cylindrical bore portion having a diameter greater than said first cylindrical bore portion, a frusto-conical baffle plate tapering inwardly toward the liquid and having a central aperture defining an air passageway between the first cylindrical bore portion and the second cylindrical bore portion, said aperture having a conical valve seat tapering inwardly from the liquid, a valve head portion having a conical face portion tapering inwardly from the liquid and adapted to sealingly seat against said valve seat when brought into contact therewith, a valve stem portion integrally formed at one end with the head portion and extending upwardly through and loosely received within the aperture, a cross bar formed integrally with the other end of the stem portion and adapted to engage the surface of the baffle plate farthest from the liquid, said stem portion spacing said head portion from said cross bar sufficiently to permit said head portion to move between a closed position wherein said face portion sealingly seats against said valve seat and a normally open position wherein said face portion does not contact the valve seat whereby a surge of liquid from said chamber to said first cylindrical bore portion will move said head portion to said closed position to prevent a flow of liquid to the second cylindrical bore portion and upon return of the liquid to the chamber permit the head portion to shift downwardly under its own weight to said normally open position.

References Cited

UNITED STATES PATENTS

| | | | |
|---|---|---|---|
| 844,003 | 2/1907 | Conrad | 137—519.5 X |
| 1,001,510 | 8/1911 | Curbey | 137—517 |
| 1,714,300 | 5/1929 | Denney | 137—519 |
| 1,986,358 | 1/1935 | Rasbridge | 137—519 |
| 2,702,046 | 2/1955 | Zimmer | 137—519 X |
| 2,775,363 | 12/1956 | Taylor | 137—519 X |
| 2,908,282 | 10/1959 | Maisch | 137—199 |
| 3,084,706 | 4/1963 | Lunde | 137—202 X |

ALAN COHAN, *Primary Examiner.*